UNITED STATES PATENT OFFICE.

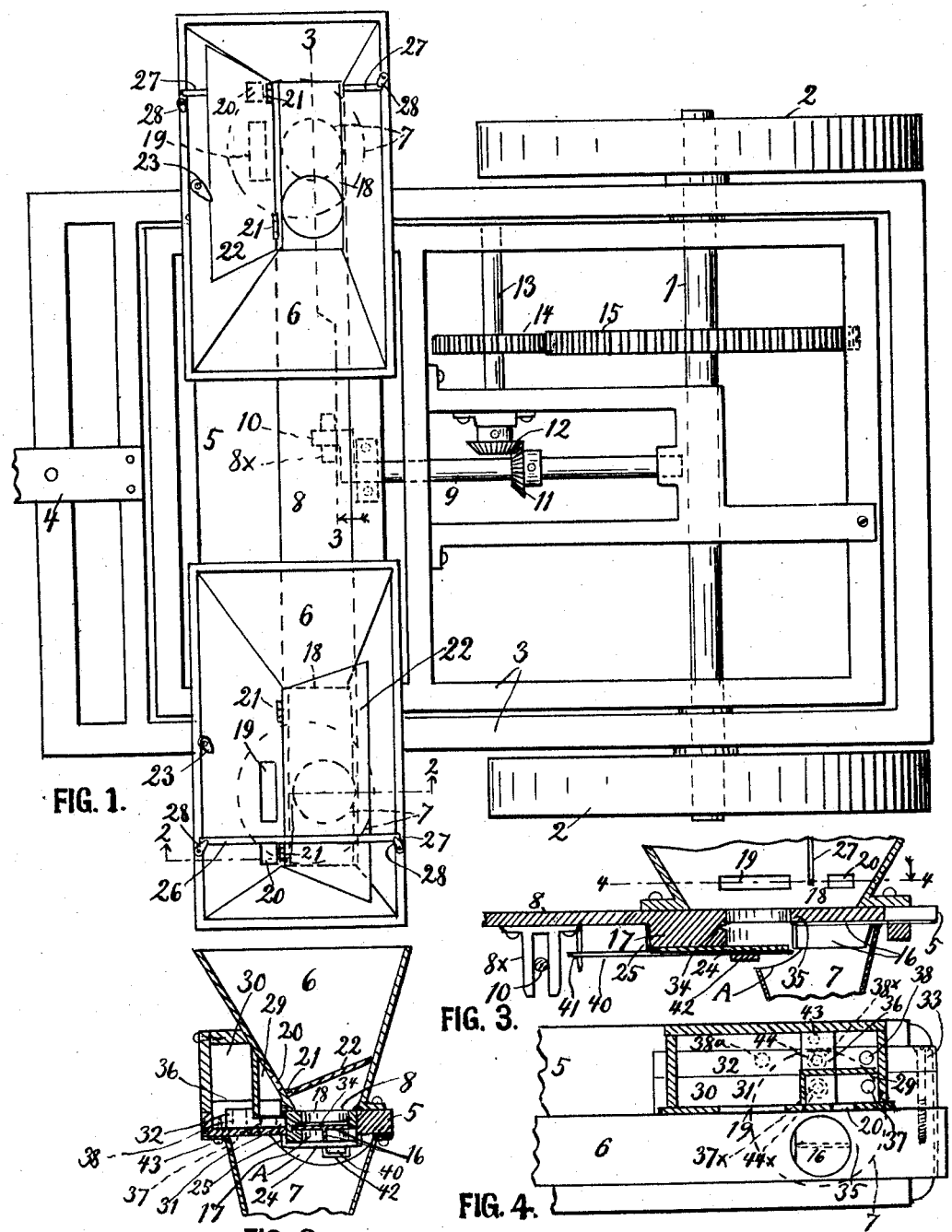

JOHN E. PAULSON, OF MINNEAPOLIS, MINNESOTA.

CONVERTIBLE PLANTING-MACHINE WITH POTATO-CUTTER.

1,326,612.   Specification of Letters Patent.   Patented Dec. 30, 1919.

Application filed December 5, 1918. Serial No. 265,445.

*To all whom it may concern:*

Be it known that I, JOHN E. PAULSON, a citizen of the United States, residing at Minneapolis, in the county of Hennepin and State of Minnesota, have invented a new and useful Convertible Planting - Machine with Potato-Cutter, of which the following is a specification.

This invention relates to planting machines of the class mounted on wheels and drawn by animals or other motive power during their operation. The object of the invention is to provide a planter which may easily be regulated so as to plant a great variety of seeds, like peas, beans, pumpkin seeds, corn, potatoes, etc., and which when planting potatoes will also cut the same into several pieces suitable for seed during the process of planting. Another object is to provide a planter which will plant corn and pumpkin seeds simultaneously, the pumpkin seeds being dropped in every other hill of corn, so as to be spaced the proper distances apart for pumpkins. Still another object is to save by such construction the great costs of building and operating independent machines for said several purposes or operations.

In the accompanying drawing—

Figure 1 is a top or plan view of the improved planter. Fig. 2 is a section on the line 2—2 in Fig. 1 with the partition 26 omitted. Fig. 3 is a section on the line 3—3 in Fig. 1. Fig. 4 is a section on the line 4—4 in Fig. 3 with the seed slide pushed over toward the right.

Referring to the drawing by reference numerals, 1 designates the main axle, 2 the supporting wheels, 3 the frame work and 4 the draft pole of a planter embodying my invention.

Secured upon the framework is a hopper base 5, with a hopper 6 fixed upon each end of it and depending seed-dropping tubes, 7, arranged directly forward of the supporting wheels, so that the latter may act as furrow closers after the seeds have been dropped into furrows made by suitable furrow openers (not shown).

Guided in a suitable slot in the hopper base is a seed slide, 8, which is reciprocated by a suitable operative connection with the ground wheels and their axle. In the present drawing I have shown such operative connection as composed of a forked bracket, 8×, secured to the underside of the slide, a shaft 9 having a crank 10 operating in said bracket, a bevel gear 11 fixed on said shaft and driven by a bevel gear 12 fixed on a transverse shaft, 13; the latter shaft having a cog wheel 14 driven by a cog wheel 15 fixed on the axle 1, which axle has the usual connection with the ground wheels. Other and better operative connections, some of them with speed changing means therein, will be found in my applications Serial Numbers 306,220, 306,221 and 306,222, filed June 23, 1919.

Each seeding tube has a side opening, A, in the side adjacent the seed moving slide; and in the other end of each tube is arranged a potato cutting blade 16 having a T-shaped edge, which is more fully described and claimed in my said application, Serial No. 306,220.

Against said cutting edge each potato is pushed by the downwardly projecting offset end 17 (see Figs. 2 and 3) of the main slide member 8, which moves below the bottom opening 18 of the hopper.

Each hopper is provided with two side ports, 19, 20, for corn and pumpkin seed respectively; and hinged within each hopper, at 21, is a false bottom or plate 22, which may be folded as in the upper hopper in Fig. 1, and held by a catch 23 so as to close the ports 19—20 and leave port 18 open for potatoes to drop into the slide and there rest upon the bottom 24 of a chute 25 until the slide pushes it against the cutter. Or, said false bottom may be turned as in the lower hopper in Fig. 1, so it covers the potato port 18 and leaves the side ports, 19—20, open during the planting of corn and pumpkin seeds or other small seeds. In the latter case a partition 26 is placed in suitable grooves 27 and secured by catches 28 to keep separate the pumpkin seeds and the corn, if the two are to be planted at the same time, and if only one kind is to be planted, the partition serves to guide that kind only to its proper port.

Each side port delivers the seed passed through it into a different side chamber 29 and 30; and below said chambers reciprocates a slide member 31—32, which is detachably secured to the main slide member, 8, by a screw 33 (see Fig. 4) so that it may be detached and a similar member substituted having smaller or larger seed-moving spaces for other seeds than corn and pumpkin seeds. Said screw 33 is accessible outside the hopper when the slide is pushed endwise to its limit.

The main slide member is at each end provided with notches 34 serving as clearings for the sharp edges of the cutter, and also with portions 35 passing upon the top of the cutter so as to sweep back therefrom into the chute the upper half of the cut potato when the slide is being retracted.

In Figs. 2 and 4 it will be seen that the slide member feeding the small seeds slides under a fixed cross bar or seed guard 36, held by a screw 43, and is formed with a thin portion 31 having one aperture 37 for pumpkin seed, and a thicker portion, 32, having two apertures, 38, 38ˣ for moving corn.

In the operation, when potatoes are being planted the same drop down one at a time into the chute 25; the potato is then pushed against the cutter and dropped one-fourth of it into the seeding tube, and one-fourth is supported on a shelf 40, which is secured at 41 to the slide member 8 and is guided in a bearing 42 underneath the bottom of the chute. When the slide is being retracted, said second quarter of the potato is swept off from the shelf by the end of the bottom of the chute and is dropped into the seeding tube; at the same time the upper half of the potato is swept into the chute and ready to be cut in two against the leg of the cutter and thus be treated just the same as the first half of the potato.

In planting corn, the potato outlet is closed by the false bottom, 22, and the partition 26 is put up and corn placed in the compartment leading to port 19 and chamber 30. And if pumpkin seed is also to be planted in every other hill of corn, the pumpkin seed is placed in the compartment having the outlet 20; and if other seeds are to be planted, which require a different slide member 31—32, such member is substituted for the corn and pumpkin seed planting member.

In Fig. 4 44ˣ designates seed outlets below the guard 36. They may be of any suitable size, only so the seeds get into the dropping tube 7. 37 shows the only seed moving aperture for pumpkin seed; when said aperture reaches the position 37ˣ it drops one or more seeds during an entire stroke back and forth of the slide 8, while the corn-carrying apertures, 38, 38ˣ, being two in number, will drop corn at each movement of the slide in either direction. 38ª indicates the position of the aperture 38ˣ when it is receiving corn.

When the potatoes are extra large or extra small the chute is lowered or raised by suitable means (not shown) and the slide is provided with yieldable means to enable it to move along the bottom of the chute also when the latter is raised or lowered. But such means coming fairly well within common mechanical construction I have not illustrated the same.

What I claim is:

1. In a planting machine, a seed moving slide having means for feeding several sizes of seeds, including potatoes, a hopper over said slide, said hopper having a comparatively large bottom opening for use in planting potatoes, and a small side opening leading to the part of the slide adapted to planting corn, a false bottom adapted to be placed over the large opening during the planting of corn, and means for holding said false bottom as a closure over the small opening during the planting of potatoes.

2. The structure specified in claim 1, said means for holding the false bottom as a closure consisting of hinges attaching the bottom to one side wall of the hopper, and a thumb-catch engaging the bottom to hold it in said closing position.

3. The structure specified in claim 1, said apertured side of the hopper having also a second aperture for pumpkin seed to pass through to the slide, the false bottom covering both of said apertures when it covers one of them, and a partition adapted to fit across the hopper and divide it into two compartments, each of which communicates with one of the said side openings when the false bottom is covering the opening for potatoes, and means for holding said partition detachably in said position.

4. The structure specified in claim 3, together with a chamber outside each of the side apertures of the hopper for receiving and guiding the seed therefrom to the proper part of the slide.

5. The structure specified in claim 4, the slide portion extending under the said side chambers being easily detachable from the rest of the slide, so as to be exchangeable for a similar part having smaller or larger feed apertures for planting of seeds other than corn and pumpkin seeds.

6. The structure specified in claim 1, and means in the upper end of the seed dropping tube for cutting the potato moved by the slide.

In testimony whereof I affix my signature.

JOHN E. PAULSON.